April 25, 1939. P. E. PEARSON 2,156,026
SIDE SEAM FOR SHEET METAL CAN BODIES
Filed April 10, 1937
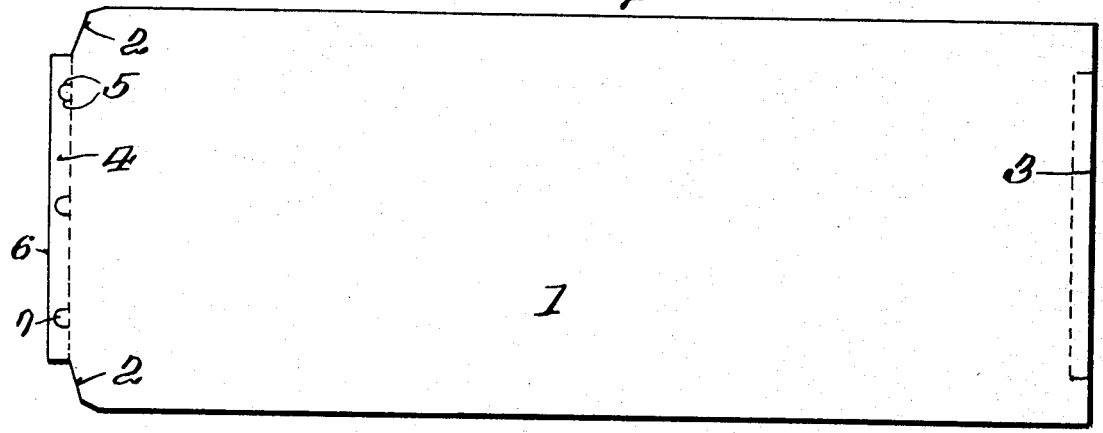
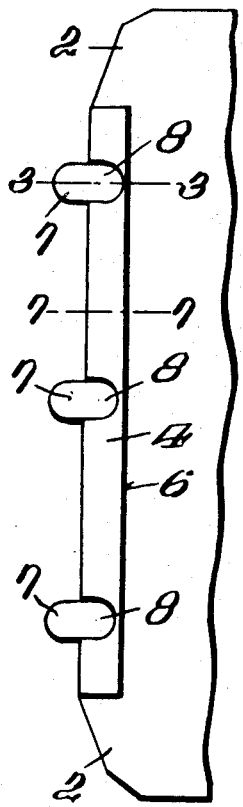
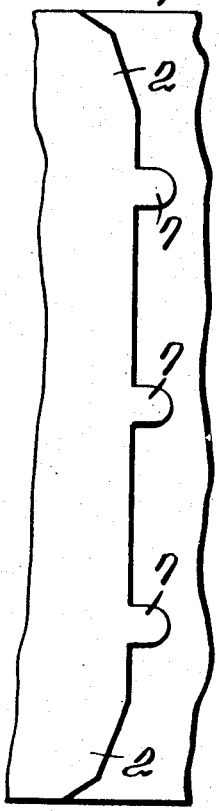
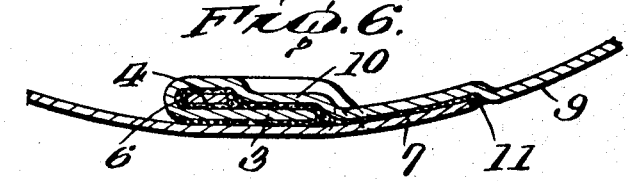
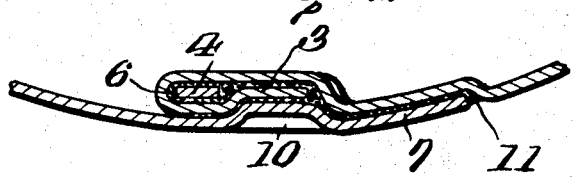
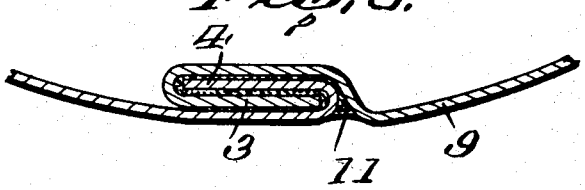
Inventor
Paul E. Pearson
By Mason & Porter
Attorneys Patented Apr. 25, 1939

2,156,026

UNITED STATES PATENT OFFICE 2,156,026

SIDE SEAM FOR SHEET METAL CAN BODIES

Paul E. Pearson, Chicago, Ill., assignor to Continental Can Company Inc., New York, N. Y., a corporation of New York Application April 10, 1937, Serial No. 136,219

2 Claims. (Cl. 220—75)

The invention relates to new and useful improvements in a sheet metal can body, and more particularly to the side seam uniting the edge portions of the body blank which forms the can body. It is a common practice in making can bodies from sheet metal to prepare the blank by shaping the end portions thereof so as to provide hooks which are interlocked in the forming of the side seam. These hooks usually extend from one end of the can body to the other, terminating short of the end where there are lap sections to facilitate the flanging of the can body. After the hooks have been formed, interlocked and bumped, then solder is applied to the side seam for solder bonding the same.

An object of the present invention is to provide a solder bonded side seam of the above type wherein the edge portion of the blank which is to form one of the hooks is cut so as to provide recesses at spaced intervals lying wholly within the hook portion and tongues which extend laterally of the side seam and overlap the body wall.

A further object of the invention is to provide a side seam of the above construction wherein the tongues overlie the outer face of the wall of the can body.

A still further object of the invention is to provide a side seam of the above type wherein the metal is deformed into the recesses in the hook portion so as to substantially fill the same.

These and other objects will in part be obvious and will in part be hereinafter more fully disclosed.

In the drawing—

Figure 1 is a plan view of a blank, notched and formed with slits in accordance with the present invention;

Fig. 2 shows in plan one edge portion, wherein the metal is cut so as to form recesses in the hook and laterally projecting tongues, the hook being folded back on to the body of the blank;

Fig. 3 is a sectional view on the line 3—3 of Fig. 2;

Fig. 4 is an enlarged view showing a portion of the can body with the seam completed and as viewed from the outside of the same;

Fig. 5 is a view showing the hooks interlocked and bumped;

Fig. 6 is a view similar to Fig. 5, but showing the metal in the body wall carrying the inner hook as deformed into the recesses formed in the outer hook;

Fig. 7 is a view similar to Fig. 5, but showing the metal of the body wall carrying the outer hook and the inner hook deformed so as to fill the recesses in the inner hook, and Figure 8 is a sectional view through the side seam on a line intermediate the laterally projecting tongues and recesses, on the line 7—7.

In carrying out the invention, the sheet metal is cut so as to provide the body blank which is indicated at 1 in the drawing. The body blank is notched as indicated at 2, 2 so as to provide the usual lap sections at the ends of the side seam. The hook portion 3 is formed by slitting the body blank in the usual manner. The hook portion 4 is formed by the notching of the body blank. The portion of the blank which forms the hook 4 is cut at spaced intervals along lines 5, 5 extending from the base line of the hook into the portion which is to form the hook. These lines along which the blank is cut lie wholly within the portion which is to form the hook, so that the edge 6 of the hook is continuous from one end of the hook to the other. In Figure 4, the metal is shown as bent to form the hook 4. When the metal is bent to form the hook, the cut-out portions are not folded with the hook portion, but are left projecting laterally from the edge of the blank, thus forming tongues 7, 7. This cutting of the metal also provides recesses 8, 8 in the hook portion 4.

As shown in the drawing, it is the outer hook, that is, the hook carried by the outer lapping section of the body blank that is cut so as to provide these spaced tongues and recesses. The hook portion 3 is of the usual construction and forms the inner hook of the side seam. When the hooks are interlocked as shown in Figure 5, the tongues 7, 7 will overlie the outer face 9 of the wall of the can body. As shown in this Figure 5, during the bumping of the side seam, the tongues 7 are forced against the body wall so as to bend the same and the outer face of the tongues are substantially flush with the outer face of the body wall.

In Figure 6 of the drawing, the metal carrying the inner hook portion 3 is deformed as indicated at 10. This is done by a raised portion on the spline in the body making machine. The metal is deformed into the recess, substantially filling the same. The adjacent faces of the inner hook portion and the body wall carrying the inner hook portion are thus placed so that solder will flow by capillary attraction between said adjacent faces, thus joining the hook portions to the body wall which supports the same. In this manner, the inner hook is, in a sense, looped about the portion of the outer hook, lying between the recess and the edge of the hook. When the parts are all solder bonded together, this makes a stronger side seam in which there is less likelihood of the solder bond being ruptured when the completed can is subjected to internal pressure. The internal pressure tends to cause the outer hook section to move on a hinge about the base of the inner hook, thus rupturing the solder bond at the right of the side seam, as viewed in Figures 5 to 8. The joining of the inner hook to the body wall through the recesses which extend all the way to the base of the outer hook, ties the base of the outer hook to the inner wall of the can body so as to greatly strengthen the side seam. The lapping tongues further tie the metal supporting the outer hook to the inner body wall so as to prevent this hinging action which ruptures the solder bond. The solder bond uniting the parts is indicated at 11 in the drawing.

It is obvious that minor changes in the details of construction and the shaping of the tongues and the arrangement thereof may be made without departing from the spirit of the invention as set forth in the appended claims.

Having thus described the invention, what I claim as new and desire to secure by Letters Patent, is—

1. A sheet metal can body having its edge portions joined in a side seam including lap portions at the ends of the side seam and interlocking hook portions extending from the lap portion at one end thereof to the other, one of said interlocking hook portions having the metal thereof cut at spaced intervals along lines extending from the base of the hook toward the edge of the hook portion and terminating short of the edge of the hook portion, thus forming a recess in the hook portion located wholly within the hook portion, the metal of the body wall supporting the other hook portion being deformed into the recess and a solder bond uniting the lap and interlocked portions of the side seam.

2. A sheet metal can body having its edge portions joined in a side seam including lap portions at the ends of the side seam and interlocked hook portions extending from the lap portions at one end of the seam to the lap portions at the other end of the seam, said outer interlocking hook portions having the metal thereof cut at spaced intervals along lines extending from the base of the hook portion toward the edge thereof and terminating short of said edge, thus forming a recess in the hook portion lying wholly within the hook portion, the metal cut from the hook portion to form the recess forming tongues which extend laterally of the side seam and overlap the body wall, the metal of the body wall supporting the inner hook being deformed into the recess in the outer hook and the solder bond uniting the lap and interlocked portions of the side seam and uniting said tongues to the body wall.

PAUL E. PEARSON.